US009219438B2

(12) United States Patent
Deak

(10) Patent No.: US 9,219,438 B2
(45) Date of Patent: Dec. 22, 2015

(54) METHOD FOR OPERATING A SEPARATELY EXCITED ELECTRIC MACHINE IN A MOTOR VEHICLE

(71) Applicant: ROBERT BOSCH GMBH, Stuttgart (DE)

(72) Inventor: Istvan Deak, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 18 days.

(21) Appl. No.: 14/361,230

(22) PCT Filed: Nov. 13, 2012

(86) PCT No.: PCT/EP2012/072466
§ 371 (c)(1),
(2) Date: May 28, 2014

(87) PCT Pub. No.: WO2013/079314
PCT Pub. Date: Jun. 6, 2013

(65) Prior Publication Data
US 2015/0048806 A1 Feb. 19, 2015

(30) Foreign Application Priority Data

Dec. 1, 2011 (DE) .......................... 10 2011 087 523

(51) Int. Cl.
| H02P 11/00 | (2006.01) |
| H02H 7/06 | (2006.01) |
| H02P 9/00 | (2006.01) |
| H02P 9/48 | (2006.01) |
| H02P 9/08 | (2006.01) |
| H02J 7/14 | (2006.01) |
| H02P 9/30 | (2006.01) |

(52) U.S. Cl.
CPC ................. *H02P 9/48* (2013.01); *H02J 7/1446* (2013.01); *H02P 9/08* (2013.01); *H02P 9/30* (2013.01); *Y02T 10/92* (2013.01)

(58) Field of Classification Search
USPC ....................................... 322/28, 29
See application file for complete search history.

(56) References Cited

U.S. PATENT DOCUMENTS

| 4,061,949 | A | * | 12/1977 | Griffis | ........................... 318/154 |
| 5,629,606 | A | * | 5/1997 | Asada | ............................. 322/28 |
| 5,675,237 | A | * | 10/1997 | Iwatani | ........................... 322/28 |
| 5,708,352 | A | * | 1/1998 | Umeda et al. | ................... 322/28 |
| 6,153,945 | A | * | 11/2000 | Koss et al. | .................... 307/10.1 |
| 6,426,609 | B2 | * | 7/2002 | Tanaka et al. | ................... 322/19 |
| 6,803,747 | B2 | * | 10/2004 | Taniguchi et al. | .............. 322/28 |
| 6,954,052 | B2 | * | 10/2005 | Fujita et al. | ..................... 322/28 |
| 2001/0043055 | A1 | * | 11/2001 | Tanaka et al. | ................... 322/28 |
| 2004/0222772 | A1 | * | 11/2004 | Fujita et al. | ..................... 322/28 |

(Continued)

FOREIGN PATENT DOCUMENTS

| DE | 10 2004 051530 | 5/2006 |
| DE | 10 2009 047172 | 6/2011 |

(Continued)

*Primary Examiner* — Pedro J Cuevas
(74) *Attorney, Agent, or Firm* — Kenyon & Kenyon LLP

(57) ABSTRACT

A method for operating a separately excited electric machine, in particular, a generator of a motor vehicle, where an exciting current flows through a rotor winding of the electric machine at a nominal current intensity during a normal operation and at a holding current intensity in an idling operation; the holding current intensity being greater than zero and less than the nominal current intensity.

18 Claims, 3 Drawing Sheets

(56) References Cited

U.S. PATENT DOCUMENTS

2014/0292285 A1* 10/2014 Kadric et al. .................. 322/28
2015/0091606 A1* 4/2015 Ge et al. .................. 324/765.01

FOREIGN PATENT DOCUMENTS

DE    10 2009 055141    6/2011
EP    0 201 243    11/1986

* cited by examiner

METHOD FOR OPERATING A SEPARATELY EXCITED ELECTRIC MACHINE IN A MOTOR VEHICLE

FIELD OF THE INVENTION

The present invention relates to a method for operating a separately excited electric machine in a motor vehicle, as well as to a processing unit for implementing it.

BACKGROUND INFORMATION

Electric machines for use in motor vehicles, in the form of the starting motor (motor) and the alternator (generator), are well-known. In modern vehicles, alternating current generators, which have a claw-pole configuration and are (separately) excited electrically, may be used as generators. As a rule, rectifiers based on semiconductor diodes may be used for rectifying the alternating current generated.

However, due to the increasing need for electrical energy in the vehicle, the effort to reduce fuel consumption and lower emissions, as well as the desire to be able to combine the advantages of an electric motor with those of an internal combustion engine, electric machines having a dual function, so-called starter generators, are also being used increasingly.

Starter generators are electric machines, which may be operated, in a vehicle, as electric motors or as generators, as a function of need. As generators, starter generators must be able to assume all of the tasks that the alternator conventionally has, namely, electrically powering the vehicle electrical system and charging the vehicle battery. As electric motors, when starting the internal combustion engine, starter generators must bring its crankshaft up to the required starting speed in a short time.

However, the use of the starter generators is not limited to the above-mentioned functions. In the case of a suitably high nominal output, in motive operation, a starter generator may assist the internal combustion engine with propulsion, e.g., while accelerating in the so-called boost operation, and for turbo-lag compensation. During braking, a portion of the braking energy may be recovered (recuperated) by a regenerative operation of a starter generator. Corresponding drive units are referred to as hybrid drives.

A re(start) of the internal combustion engine, which is as rapid as possible, is particularly desirable in vehicles having an automatic start-stop mechanism. To this end, it is necessary to build up, as rapidly as possible, the exciting current in the exciting coil (rotor) of the electric machine (conventional generator or starter generator) used in each instance.

As a rule, in corresponding electric machines, the exciting current may be set using a pulse-width modulated voltage signal, where in the case of continuous activation (thus, a pulse duty factor or pulse duty factor of the voltage signal of 100% or 1), an exciting current having a nominal current intensity flows. In this connection, it is a current intensity, at which an exciting coil of the machine is continuously driven in normal operation, and for which it is configured. After the pulse duty factor of 100% is set, the nominal current intensity is only reached with a certain delay, e.g., only after 300 ms, due to the high inductance of the rotor winding. This delay accordingly slows down the starting of the engine and is therefore not satisfactory.

Thus, there is a need for suitable improvements, in particular, in vehicles having an automatic start-stop mechanism.

SUMMARY OF THE INVENTION

The present invention provides a method for operating a separately excited electric machine, in particular, a generator of a motor vehicle, as well as a processing unit for implementing it, which include the features of the independent claims. Advantageous refinements are the subject matter of the dependent claims and the following description.

The present invention provides that during an idling operation (that is, in phases in which no regenerative or motive operation is called for), the exciting current through the rotor winding of an electric machine in a motor vehicle be allowed to remain at a holding current intensity greater than zero and not be completely returned to zero. Starting out from the holding current intensity, a nominal current intensity for the regenerative or motive operation ("normal operation") may be reached more rapidly than from zero. The holding current intensity may be less than 50% of the nominal current intensity. The holding current intensity may be set in the open control loop or regulated in the closed control loop.

In this manner, in motive operation, e.g., the time necessary for starting the internal combustion engine is advantageously shortened. The present invention also provides special advantages in the regenerative operation. Under certain driving conditions, switching off the generator (so-called Standby Function) is also desired in generator operation, e.g., in order to remove load from the drive train. In such a case, the vehicle electrical system is usually powered by the vehicle battery, until the generator is put into operation again. In the related art, the generator is also switched off by switching off the exciting current. However, when the electrical system voltage (which is provided, in the meantime, e.g., by the battery) drops, this causes the switching-on of the generator to take up a relatively long time span, since the exciting current must be increased from zero. Therefore, unwanted voltage dips in the vehicle electrical system may occur. In this case, as well, the present invention provides an option of operating the electric machine in such a manner, that a switchover from a first state, in which essentially no power is delivered to the electrical system of a motor vehicle ("Standby"), to a second state, in which power is delivered to the electrical system of the motor vehicle, may be made as rapidly as possible.

During operation as a motor, in a normal operation, an exciting current having a nominal current intensity flows through the rotor winding of the electric machine. A "normal operation" is understood to be an operating mode, which may be maintained in a corresponding machine for a relatively long period of time, during which it fulfils its specific task. In this connection, it is, for example, a period of time, during which the electric machine transmits a corresponding torque to a crankshaft of an internal combustion engine in order to start it, or during which it assists the internal combustion engine, e.g., in overcoming a turbo lag. The corresponding electric machine is structurally configured for continuous operation at this nominal current intensity, and delivers, at it, a maximum torque (in motive operation) or a maximum voltage (in regenerative operation), without the thermal loading of the rotor winding exceeding a permissible value. Continuous use at a higher current is not possible, since the rotor winding would be overloaded and possibly damaged.

A "starting phase" is understood to be a period of time immediately after switching on an exciting current. As a rule, this period of time only lasts until the exciting current has reached a desired value (in particular, the nominal current intensity), as explained above.

During both normal operation and the starting phase, a flow of current through the rotor winding is generated by applying a pulse-width modulated voltage signal having a pulse duty factor and a voltage value to the rotor winding of the machine. As a rule, the voltage value of the pulse-width modulated voltage signal, i.e., the amplitude of the pulse, is fixed by the respective voltage source used, e.g., a starter battery. According to the related art, the electric machine and the voltage source are adjusted to one another in such a manner, that in the case of a pulse duty factor of the voltage signal of 100%, an exciting current having the nominal current intensity flows (with a certain delay) through the rotor winding.

The term "pulse duty factor" indicates the ratio of the pulse duration to the pulse period for the periodic sequence of voltage pulses of the pulse-width modulated voltage signal.

As also explained below with regard to FIG. 3A, the conventional operation of a generator upon the starting of an internal combustion engine takes place in such a manner, that at the starting time, the pulse duty factor of the pulse-width modulated voltage signal is set from 0% to 100%. The exciting current then reaches the nominal current intensity with a certain delay.

A combination of a voltage source and a rotor winding may be used, which causes the exciting current having the nominal current intensity to already flow below the maximum pulse duty factor. In a conventional way of looking at the situation, this would mean that the rotor winding employed would be "under-dimensioned" for the voltage source used (or correspondingly, the voltage source would be "over-dimensioned" for the rotor winding). In this specific embodiment, the exciting current having the nominal current intensity already flows at a pulse duty factor (referred to as the "first pulse duty factor" in the scope of the present application) of less than 100%, which may be less than 90%, 70%, 50% or 40%.

The pulse duty factor for setting the holding current intensity (referred to as the "second pulse duty factor" in the scope of the present application) is less than the first pulse duty factor and may be less than 90%, 70%, 50%, 40%, 20% or 10%.

According to another specific embodiment of the present invention, for a brief period of time immediately after the beginning of the flow of current, the rotor winding is driven by a voltage signal having a pulse duty factor (referred to as the "third pulse duty factor" in the scope of this application), which, in continuous operation, would produce a current value that is greater than the nominal current intensity. In this manner, the period of time for reaching the nominal current intensity may be further shortened, as is apparent, e.g., from FIG. 3B. In this context, the rotor winding does not have to be configured for continuous operation at the third pulse duty factor. Thermal destruction of the rotor winding may be prevented by selecting the corresponding driving time interval to be sufficiently short. As mentioned, certain delays in reaching the specific current values in a rotor winding always occur, due to the coil inductance. Thus, the flow of current through the rotor winding only builds up over a certain, ascertainable period of time (in the present invention, e.g., roughly 50 ms). Therefore, the flow of excess current through the rotor winding may be prevented by reducing the pulse duty factor again after a short period of time. In particular, this reduction may be carried out stepwise in steps of equal or varying time duration. The selection of the pulse duty factor, starting from the second pulse duty factor for the holding current intensity, over the third pulse duty factor for the overshoot, to the first pulse duty factor for the nominal current intensity, may be set in the open control loop; during operation, the control variables being able to be calculated or predetermined by a processing unit (field regulator) and stored in a lookup table.

In order to keep, as short as possible, the period of time until the current flows through the rotor winding at the nominal current intensity, a pulse duty factor of 100% may be used as a third pulse duty factor; thus, voltage is continuously applied to the rotor winding. The first pulse duty factor, at which the flow of current has the nominal current intensity, may be, e.g., 25 to 40% of the third pulse duty factor or less than 70%, less than 60%, less than 50%, less than 40%, less than 30%, less than 20%, or less than 10% of the third pulse duty factor. If the above-mentioned values are used, then standard components may be used in a simple and cost-effective manner for implementing the present invention.

If the electric machine is rotated while current flows at the holding current intensity, a voltage is induced although no regenerative operation has been called for. Thus, in order to prevent excessive voltages, the holding current intensity is advantageously set in such a manner, that in a predefined speed range of the rotor, normally between 0 rpm and 22000 rpm, the rectified voltage (voltage that can be tapped after the rectifier) is less than the voltage of the vehicle battery at the end of charging. If the rotor also includes permanent magnets in addition to the rotor winding, a correspondingly lower holding current intensity is sufficient.

An exemplary battery voltage for the rotor winding is between 24 V and 60 V (permissible touch voltage), which may be at 48 V, and is, in particular, markedly greater than a conventional vehicle electrical system voltage of 14 V. The nominal current intensity is reached more rapidly, using an increased voltage. If a rotor winding identical to that of a 14 V generator is used, then a pulse duty factor of app. 30% (14/48) results for the nominal current intensity. The battery voltage varies as a function of the state of charge and/or age of the battery, and as a function of the instantaneous battery current, so that the range of the pulse duty factor for the nominal current intensity may be between 25%-40%. If the system is operated at a different voltage, e.g., 28 V, as is presently prevalent in the cargo truck sector, a pulse duty factor of 50% results for the nominal current intensity. These measures may be implemented, e.g., by using an additional voltage source in a vehicle electrical system to provide the pulse-width modulated voltage signal. In this connection, it may be, e.g., an additional battery having a voltage of 48 V (in comparison with the regular battery having 14 V). If a suitable, additional voltage source, which supplies a higher voltage, is provided for applying the voltage signal to the rotor winding of the electric machine, then no structural adaptations of an electric machine are necessary, and consequently, from the standpoint of control engineering, the method of the present invention may be implemented in an inexpensive and uncomplicated manner, e.g., in a corresponding control unit.

A processing unit according to the present invention, e.g., a field regulator of a motor vehicle, is configured to execute a method of the present invention, in particular, using software.

The implementation of the method in the form of software is also advantageous, since this generates particularly low costs, in particular, when an executing control unit is used for other tasks and is therefore already present. Suitable data carriers for making the computer program available include, in particular, diskettes, hard disks, flash memories, EEPROMs, CD-ROM's, DVD's, inter alia. A download of a program via computer networks (Internet, intranet, etc.) is also possible.

Further advantages and refinements of the present invention are derived from the description and the accompanying drawing.

It is understood that the features mentioned above and the features yet to be described below may be used not only in the combination given in each case, but also in other combinations or individually, without departing from the scope of the present invention.

The present invention is represented schematically in the drawing in light of exemplary embodiments and is described in detail below with reference to the drawings.

DETAILED DESCRIPTION

Figure 1:
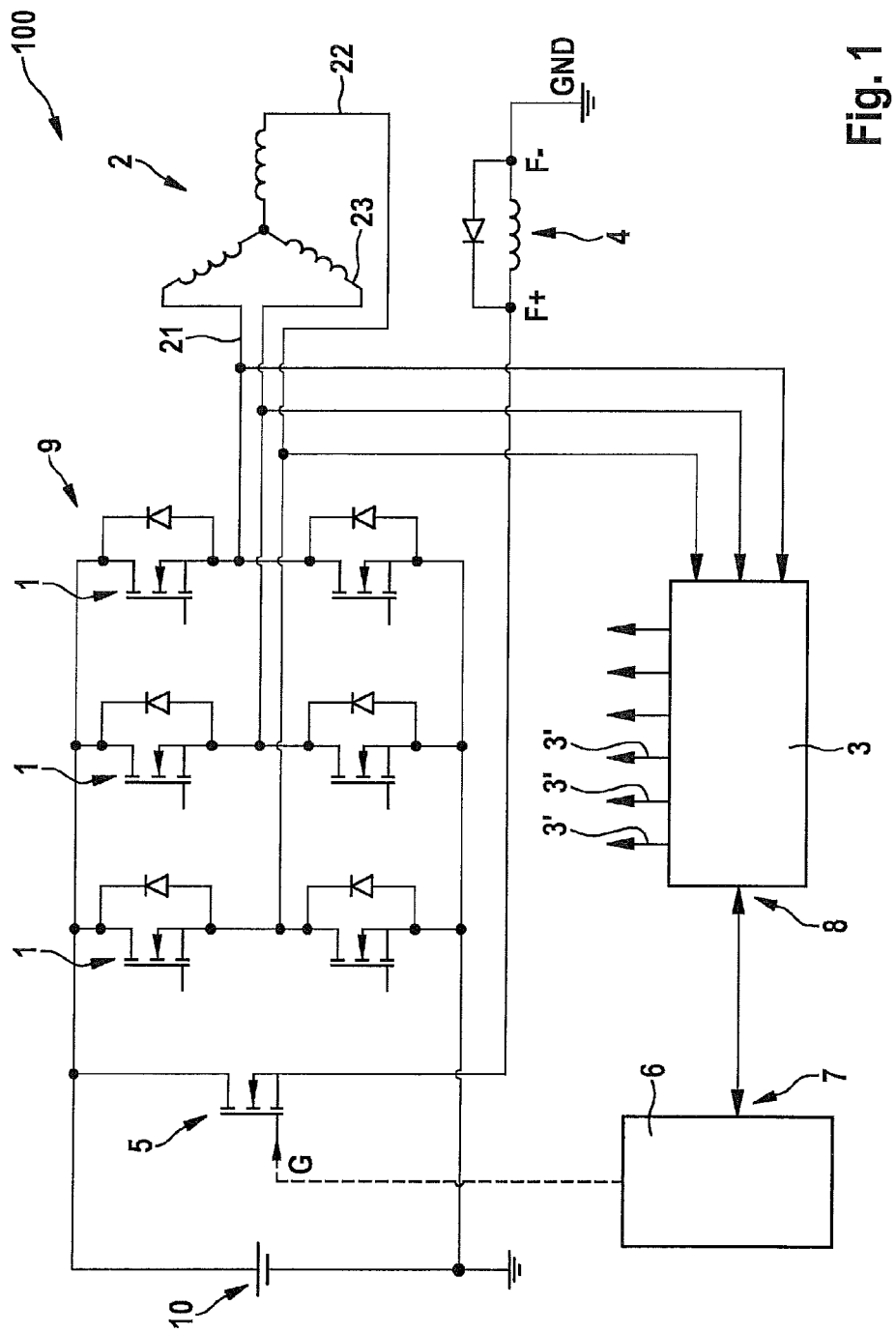
FIG. 1 shows a circuit diagram of a starter generator operable in accordance with a specific embodiment of the present invention.

FIG. 1 shows a circuit diagram of a starter generator of a motor vehicle operable in accordance with a specific embodiment of the present invention. The starter generator is denoted, on the whole, by reference numeral 100 and includes a stator 2 having three phases 21, 22, 23.

A rotor winding 4 is provided, to which a pulse-width modulated voltage signal of a voltage source 10, e.g., a battery, may be applied, using timing device 5, e.g., a suitable metal oxide semiconductor field effect transistor (MOSFET). To this end, timing device 5 is controlled, e.g., at a gate terminal G, by a control unit 6, using a control signal.

Control unit 6 may be connected to a rectifier control unit 3 via interfaces 7, 8; the rectifier control unit triggering active circuit elements 1 of a rectifier 9 via outputs 3'; the rectifier being connected to phases 21, 22, 23 of stator 2, e.g., in accordance with a rotor position. Active circuit elements 1 of rectifier 9 may also be corresponding MOSFET's, which are configured for the respective currents and voltages.

To carry out the method of the present invention, voltage source 10 advantageously supplies a higher voltage (e.g., 48 V) than a regular vehicle electrical system voltage (e.g., 14 V), which is provided for powering the regular load circuits in the vehicle electrical system. Starter generator 100 advantageously supplies the higher voltage, as well. This may be converted to a lower vehicle electrical system voltage, e.g., using a d.c. voltage converter not shown.

For its part, however, rotor winding 4 is configured for continuous operation at a lower voltage, e.g., the regular vehicle electrical system voltage of 14 V, with a pulse duty factor of 100%. If the rotor winding 4 in the set-up illustrated were to be operated at the higher voltage and with the pulse duty factor of 100%, it could possibly be destroyed thermally.

Figure 3A:
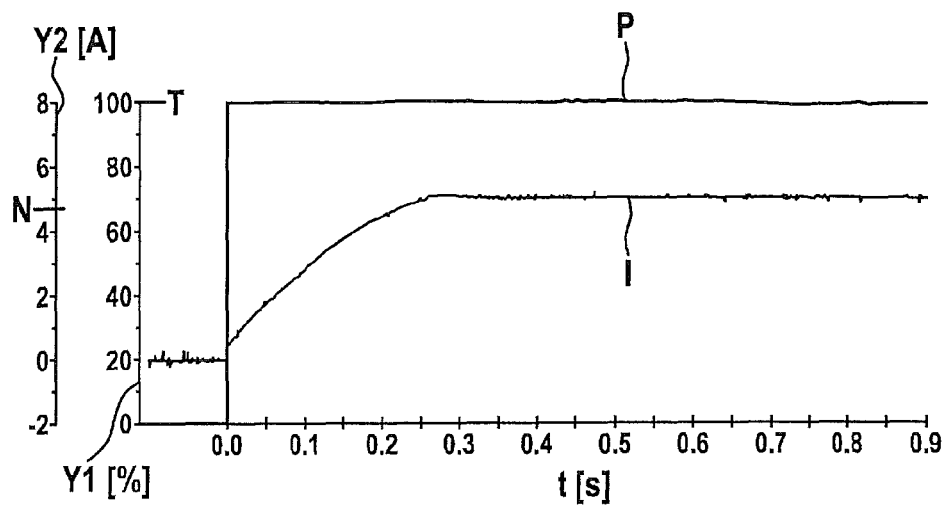
FIG. 3A shows a current characteristic when current flows through a rotor winding of a starter generator according to the related art.

In a normal operation, rotor winding 4 is operated at a much lower pulse duty factor, and it is only controlled at a pulse duty factor of 100% in a starting phase, which means that the current through rotor winding 4 reaches the setpoint current value very quickly (c.f. FIG. 3A).

Figure 2:
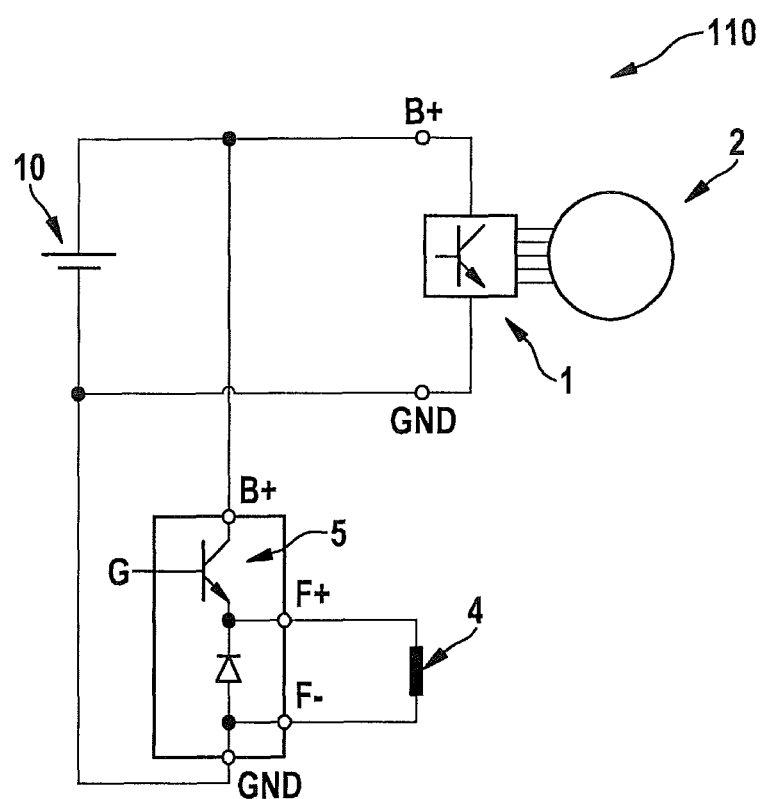
FIG. 2 shows a field controller, which may be used for operating a starter generator according to a specific embodiment of the present invention.

FIG. 2 shows a set-up including a field regulator, which is designated, on the whole, by reference numeral 110 and may be used for operating a starter generator 100 according to a particular specific embodiment of the present invention.

As mentioned, field regulator 110 includes a timing device 5, which, for example, takes the form of a MOSFET, whose drain terminal is connected to a positive voltage terminal B+ of a corresponding voltage source 10, e.g., of a battery supplying 48 V. The source terminal of timing device 5 is connected to positive terminal F+ of rotor winding 4, e.g., via a first carbon brush. Negative terminal F− of rotor winding 4 is connected to ground GND, e.g., via a second carbon brush. A free-wheeling diode is connected in parallel with the rotor winding in the blocking direction.

Timing device 5 is controlled, e.g., at its gate terminal G, by a timed signal, using the pulse duty factor of which the magnitude of the exciting current may be set. In the case of a conventional starter generator according to the related art, as explained several times, rotor winding 4 is configured so that in response to a voltage continuously switched on (thus, a pulse duty factor of 100%), the exciting current flows at a nominal current intensity. This nominal current intensity is dimensioned such that a corresponding current may flow continuously in the speed range relevant to generator operation, without the rotor winding heating up in an excessively intense manner.

However, in the case of the exemplary embodiment described, a starter generator 100 is dimensioned so that at a duty factor of significantly less than 100%, e.g., at a duty factor of 30%, the exciting current already flows through its rotor winding 4 at a nominal current intensity.

Figure 3B:
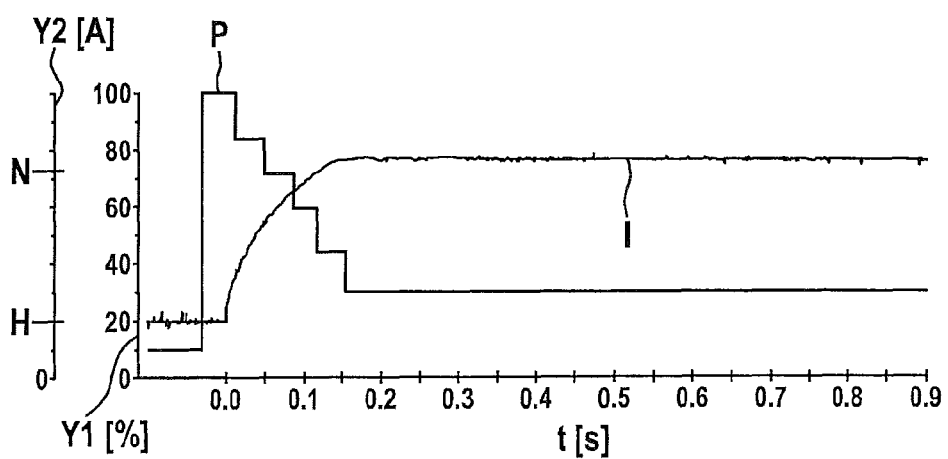
FIG. 3B shows a current characteristic when current flows through a rotor winding of a starter generator according to a specific embodiment of the present invention.

FIGS. 3A and 3B show current characteristics when current flows through a rotor winding of a starter generator according to the related art and according to a specific embodiment of the present invention.

In this context, in the respective graphs of FIGS. 3A and 3B, pulse duty factors P and current signals I are plotted versus a time t in seconds on the abscissa. A first ordinate Y1 indicates, in each instance, the scale, in percent, relevant to the plotted pulse duty factors P; a second ordinate Y2 indicates, in each instance, the scale, in amperes, relevant to the plotted current signals I.

In the control characteristic of the related art, illustrated in FIG. 3A, pulse duty factor P is increased abruptly from 0 to 100% at a starting time of 0.0 seconds. However, due to the high inductance present in a corresponding rotor winding 4, starting from zero, nominal current intensity N of exciting current I only sets in with a certain time delay, in this instance, app. 300 ms. Rotor winding 4 is set up for continuous operation at a pulse duty factor of 100%.

The control of the present invention is illustrated in FIG. 3B. In this connection, it may be the same rotor winding 4 as in FIG. 3A, but a voltage of 48 V is applied to it, instead of 14 V, as in FIG. 3A. In this manner, nominal current intensity N of exciting current I is already reached at a pulse duty factor of app. 30%. In addition, in time frames in which no motive or regenerative operation is called for, in this instance, in particular, for t<0, a holding current of intensity H flows through the rotor winding.

Now, if rotor winding 4 is temporarily driven at a pulse duty factor of 100%, in this instance, for less than 50 ms, during a short period of time after being switched on, a very steep increase in the exciting current up to nominal current intensity N is achieved. Consequently, nominal current intensity N is also already reached after app. 150 ms.

Such control may be carried out in either an open-loop or closed-loop manner. In the first case, the pulse duty factor is set to 100% for a fixed time and subsequently reduced to the value necessary for retaining nominal current intensity N, in particular, in steps as in FIG. 3B, or all at once.

In the second case, the exciting current is ascertained using a measuring technique. To this end, e.g., the desired exciting current (thus, nominal current intensity N) may be set by a PI controller; the control variable of the PI controller being the pulse duty factor.

By appropriately selecting the controller parameters, the control may be adjusted in such a manner, that nominal current intensity N is reached in as short a time as possible, without excessively overshooting the exciting current.

As mentioned, the measures of the present invention may be used in claw-pole generators in motor vehicles, which, in addition to the generator operation, also assume the function of starting the engine (starter generators). In this connection, the engine starting time is reduced markedly.

What is claimed is:

1. A method for operating a separately excited electric machine, which is a generator of a motor vehicle, the method comprising:
    providing an exciting current which flows through a rotor winding of the electric machine at a nominal current intensity during a normal operation and at a holding current intensity during an idling operation, in which neither a regenerative, nor a motive operation is called for;
    wherein the holding current intensity is greater than zero and less than the nominal current intensity.

2. The method of claim 1, wherein the holding current intensity is at most 50% of the nominal current intensity.

3. The method of claim 1, wherein the holding current intensity is selected so that a voltage induced by the electric machine in the idling operation is less than the vehicle battery voltage at the end of charging.

4. The method of claim 1, wherein the exciting current at the nominal current intensity is provided by applying a pulse-width modulated voltage signal having a first pulse duty factor and a voltage value to the rotor winding of the machine, and wherein the exciting current at the holding current intensity is provided by applying a pulse-width modulated voltage signal having a second pulse duty factor and the voltage value.

5. The method of claim 4, wherein the voltage value is greater than 24 V and less than 60 V.

6. The method of claim 4, wherein the first pulse duty factor is 100%, less than 100%, less than 90%, less than 70%, less than 50% or less than 40%.

7. The method of claim 4, wherein the second pulse duty factor is less than 90%, less than 70%, less than 50%, less than 40%, less than 20% or less than 10%.

8. The method of claim 4, wherein during a starting phase of the electric machine, a pulse-width modulated voltage signal having the voltage value and a third pulse duty factor is applied to the rotor winding, and wherein the third pulse duty factor is greater than the first pulse duty factor.

9. The method of claim 8, wherein on the basis of closed-loop control, the voltage signal having the third pulse duty factor is applied to the rotor winding until the exciting current flowing through the rotor winding has the nominal current intensity.

10. The method of claim 9, wherein the voltage signal having the third pulse duty factor is applied to the rotor winding for a predefined period of time.

11. The method of claim 8, wherein during the starting phase, the pulse duty factor is reduced in steps from the third pulse duty factor to the first pulse duty factor.

12. The method of claim 4, wherein the exciting current flowing through the rotor winding is adjusted to the holding current based on a measurement of the exciting current and by controlling the second pulse duty factor.

13. The method of claim 4, wherein the exciting current flowing through the rotor winding is adjusted to a setpoint holding current intensity by providing a fixed, second pulse duty factor.

14. The method of claim 4, wherein the voltage value is greater than 24 V and less than 48 V.

15. The method of claim 4, wherein during a starting phase of the electric machine, a pulse-width modulated voltage signal having the voltage value and a third pulse duty factor is applied to the rotor winding, and wherein the third pulse duty factor is greater than the first pulse duty factor; and the third pulse duty factor is 100%.

16. The method of claim 1, wherein the holding current intensity is selected so that a voltage induced by the electric machine in the idling operation is less than the vehicle battery voltage at the end of charging, and not more than 95% of the voltage at the end of charging.

17. A processing unit, comprising:
    a processor arrangement for operating a separately excited electric machine, which is a generator of a motor vehicle, by performing the following:
        providing an exciting current which flows through a rotor winding of the electric machine at a nominal current intensity during a normal operation and at a holding current intensity during an idling operation, in which neither a regenerative, nor a motive operation is called for;
        wherein the holding current intensity is greater than zero and less than the nominal current intensity.

18. A computer readable medium having a computer program, which is executable by a processor, comprising:
    a program code arrangement having program code operating a separately excited electric machine, which is a generator of a motor vehicle, by performing the following:
        providing an exciting current which flows through a rotor winding of the electric machine at a nominal current intensity during a normal operation and at a holding current intensity during an idling operation, in which neither a regenerative, nor a motive operation is called for;
        wherein the holding current intensity is greater than zero and less than the nominal current intensity.

* * * * *